United States Patent [19]

Kunig et al.

[11] Patent Number: 4,724,582

[45] Date of Patent: Feb. 16, 1988

[54] APPARATUS FOR THE PORTIONWISE DELIVERY OF PASTY MATERIALS, PARTICULARLY SAUSAGE STIFFING

[75] Inventors: Helmut Kunig, Bad Schwartau; Heinz-Dieter Hegelmann, Lubeck; Manfred Mette, Hamburg, all of Fed. Rep. of Germany

[73] Assignee: Nordischer Machinenbau Rud. Baader GmbH & Co KG, Lubeck, Fed. Rep. of Germany

[21] Appl. No.: 931,408

[22] Filed: Nov. 14, 1986

Related U.S. Application Data

[63] Continuation-in-part of Ser. No. 818,178, Jan. 13, 1986, abandoned.

[30] Foreign Application Priority Data

Jan. 11, 1985 [DE] Fed. Rep. of Germany ....... 3500697

[51] Int. Cl.[4] .............................................. A22C 11/08
[52] U.S. Cl. ......................................... 17/40; 141/256
[58] Field of Search ............... 17/33, 35, 40; 141/256, 141/284; 198/535, 538, 550.1, 550.6

[56] References Cited

U.S. PATENT DOCUMENTS

| 1,528,887 | 3/1925 | Offenhauser | 17/40 X |
| 3,391,808 | 7/1968 | Barber et al. | 198/538 X |
| 3,733,653 | 5/1973 | Javaloy et al. | 17/33 X |

*Primary Examiner*—Wille G. Abercrombie
*Attorney, Agent, or Firm*—Thomas R. Morrison

[57] ABSTRACT

The invention relates to an apparatus for delivering pasty substances in portions of predetermined weight and/or volume. The problem is to provide an ergonomically optimized apparatus of the continuously functioning type, which is solved essentially in that the storage hopper and the conveyor are laterally associated with one another, the outlet port of the latter being higher than its inlet port and the hopper being mounted on a pivoting device, part of which forms a closure for a conveyor housing.

10 Claims, 3 Drawing Figures

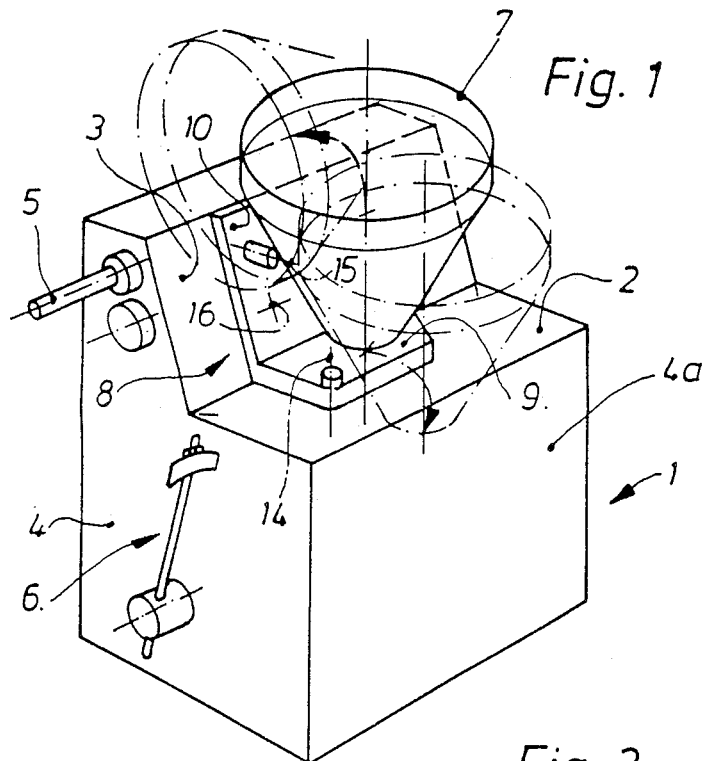
Fig. 1
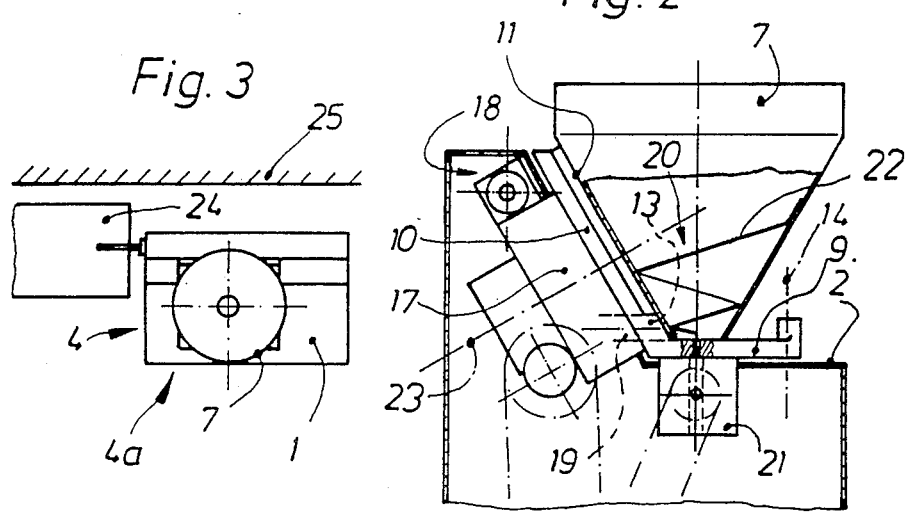
Fig. 3
Fig. 2

APPARATUS FOR THE PORTIONWISE DELIVERY OF PASTY MATERIALS, PARTICULARLY SAUSAGE STIFFING

CROSS-REFERENCE TO RELATED PATENT APPLICATION

This application is a continuation-in-part of my copending patent application Ser. No. 818,178, filed Jan. 13, 1986, now abandoned.

BACKGROUND OF THE INVENTION

1. Field of the Invention

The invention relates to an apparatus for delivering pasty substances (materials), particularly sausage stuffing, in portions of predetermined weight and/or volume, the apparatus comprising a machine frame inter alia defining a side face and a front face; a conveyor including a rotor means driven to rotate in a rotor casing about a rotation axis and being equipped with displacement chambers on their circumference, as well as an inlet port and an outlet port; and a tiltable or pivotable storage hopper for receiving a supply of the substance, which hopper is under atmospheric pressure, has an outlet in the region of its base and includes a driven plugging device.

2. Prior Art

A similar apparatus is known and used in practice. In this apparatus, use is made of a twin-screw conveyor, whose inlet end is positioned below the storage hopper and rises towards its outlet end. The conveyor screws can be taken out towards the outlet particularly for the purpose of cleaning the machine, and the upper part of the storage hopper is tiltable. This known device has certain disadvanages with regard to ergonomics due to the arrangement or alignment of the conveyor relative to the hopper, whereas the parts to be cleaned are difficult to reach and inspect, so that a regular cleaning and maintenance causes various difficulties.

3. Objects of the Invention

It is an essential object of the invention to suggest an apparatus for the portioning of pasty substances, which is improved under ergonomical aspects. Another important object of the present invention is to improve the structure and arrangement of such apparatus to enable an easy handling for cleaning and maintenance purposes.

SUMMARY OF THE INVENTION

In an apparatus comprising a machine frame having a front and a side face, a conveyor including a rotor of the displacement chamber type driven to rotate about a rotation axis in a rotor casing, and further including an inlet port and an outlet port, and further comprising a storage hopper for the substance, which hopper is under atmospheric pressure, has an outlet in the region of its base and includes a driven plugging device, these objects are achieved, according to the invention, in that the storage hopper is mounted on a mounting device which is pivotable relative to the machine frame; in that the conveyor is associated to the flank of the storage hopper remote from the front of the machine frame, in such a way that the rotation axis of the rotor is substantially perpendicular to the flank, the latter being equipped with a cover flange closing the rotor casing and forming part of the pivotable mounting device; and in that the outlet port of the conveyor is positioned higher with respect to the inlet port, the latter coinciding with the hopper outlet in the hopper's working position.

The advantages to be obtained thereby consist in particular in the following:

a low filling height in the case of a conventional outlet height, easy dismantability and accessibility—all parts in contact with the filling material can be accessed, dismantled, and inspected easily, which gives an optimum possibility of cleaning and maintenance.

According to a preferred embodiment the outlet port of the conveyor may be located in the rotation plane of the rotor. Due to the thus resulting short guidance, of the material being conveyed, which guidance is of low flow resistance, this construction adds to the careful handling of the material and prevents any risk of separation.

Under the aspect of an easy maintenance, it is advantageous if the storage hopper is mounted pivotably selectively about a pivot axis extending substantially parallel or substantially perpendicular to its central axis. It is particularly advantageous if the pivot axis is located on the side of the storage hopper facing the outlet port of the conveyor, because as a result the machine can still be operated when its back and rear faces are inaccessible, without thereby impairing the control and/or maintenance.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows an overall view of an apparatus according to the present invention in a centrally axonometric representation, FIG. 2 shows the arrangement of the various individual units by viewing into the apparatus frame; and FIG. 3 shows a plan view for the arrangement of the machine in operation.

DETAILED DESCRIPTION OF THE PREFERRED EMBODIMENT

A machine frame 1 is designed in desk- or lectern-like manner and has a side face 4 and a front face 4a. The frame is provided with a substantially planar table surface 2, whose rearward edge is followed by an upwardly sloping desk surface 3. Behind the desk surface 3 and from the side face 4 of machine frame 1 there projects a filling tube 5, connection facilities for conventional, not shown accessories being provided in the region of said tube. A control lever 6 for the control of the apparatus, which can be operated by the operator's knee or thigh is also located on the side face 4. The table surface 2 serves to receive a storage hopper 7, which is fixed to a mounting device in the form of an angle bracket 8. This bracket 8 has a portion located on the table surface 2, which portion is constructed as a flat support plate 9, whereas a second bracket portion associated to the desk surface 3 is constructed as a cover flange 10. The arrangement and design of the storage hopper 7 is such that the rear flank 11 thereof is supported against the cover flange 10 and is connected two-dimensionally thereto. Adjacent to its base the hopper 7 is provided with an outlet 13 passing through cover flange 10. The storage hopper 7 together with the angle bracket 8 is pivotably mounted about a pivot axis 14 which extends perpendicular to the table surface 2. Thereby the hopper can be pivoted into a forward open position as indicated by the right hand dash-dotted lines in FIG. 1. Selectively, there may also be provided a pivot axis 15 located in the region of the cover flange 10 and extending perpendicular to the central axis of the storage hopper 7, which second axis serves for pivoting the hopper into an open position indicated by the left-hand dash-dotted lines. In the working position, the cover flange 10 of the bracket 8 is held pressed against the desk surface 3 by means of appropriate fast action connection elements 16 not shown in detail. The cover flange 10 brings about the sealing of a conveyor 17 which is arranged in a conveyor housing formed by the rear part of the desk-like frame and not referred to in detail in the drawings. This conveyor has a rotational axis 23, is provided with not shown radial feed chambers, and has an outlet port 18 which is associated to the filling tube 5. For safeguarding an appropriate sealing, the conveyor 17 defines a sealing plane with which it is inserted into the desk surface 3, thus arranging the rotational axis 23 of the conveyor 17 to lie perpendicular to a corresponding sealing plane of the cover flange 10 and therefore to the rear flank 11 of the storage hopper 7. The outlet 13 at the bottom of the storage hopper 7 coincides with an inlet port 19 of the conveyor 17. A plugging device 20 is loctaed in the storage hopper 7, which comprises a feed screw 22 adjusted to the inner contour of the storage hopper 7. Plugging device 20 can also be driven by a gear 21 inserted in the table surface 2.

For maintenance purposes and for cleaning the apparatus the plugging device 20 is first removed from the storage hopper 7. This removal can be facilitated by using a suitable fast action coupling. The fast action connection elements 16 attaching the cover flange 10 to the desk surface 3 are then released, whereupon the angle bracket 8 and thus the hopper 7 are swung out. Not shown electrical locking means in the region of the pivot axis 14 or 15 can ensure that the apparatus cannot be switched on when the storage hopper 7 is swung out. In this position, the conveyor 17 is freely accessible in a handy working height, as is the storage hopper 7 itself with all its connection faces and openings, so that any cleaning and/or maintenance can be performed correctly in an uncomplicated manner.

This work can even be performed in an unimpeded manner if, as shown in FIG. 3, the back of the apparatus is placed against a wall 25 and a work table 24 is arranged below the filling tube 5.

What is claimed is:

1. Apparatus for delivering pasty substances, particularly sausage stuffing, in portions with respect to at least one of predetermined weight and volume, the apparatus comprising
   (a) a machine frame having inter alia a side and a front,
   (b) conveyor means including a rotor driven to rotate about an axis of rotation in a casing for said rotor and having displacement chambers on its circumference, and further including an inlet port and outlet port,
   (c) storage hopper means for receiving a supply of said substance, which storage hopper means are under atmospheric pressure, define at least a flank and a base, are provided with an outlet in the region of said base and include driven plugging means, and
   (d) pivotable mounting means for mounting said storage hopper means pivotably relative to said machine frame, the apparatus being arranged such that
   (e) said conveyor means are associated to said flank of said storage hopper means remote from said front of said machine frame in such a way that said axis of rotation of said rotor is arranged substantially perpendicular to said flank, the latter being equipped with a cover flange forming part of said mounting means and a closure for said rotor casing of said conveyor means and
   (f) said outlet port of said conveyor means is positioned at a higher level with respect to said inlet port, the latter coinciding with said outlet of said hopper means in the working position of the latter.

2. Apparatus as claimed in claim 1, wherein said outlet port of said conveyor means is arranged in a rotation plane defined by said rotor.

3. Apparatus as claimed in claim 1, wherein said storage hopper is mounted so as to pivot about a pivot axis substantially parallel to a central axis of said hopper.

4. Apparatus as claimed in claim 2, wherein said storage hopper is mounted so as to pivot about a pivot axis substantially parallel to a central axis of said hopper.

5. Apparatus as claimed in claim 1, wherein said storage hopper is mounted so as to pivot about a pivot axis substantially perpendicular to a central axis of said hopper.

6. Apparatus as claimed in claim 2, wherein said storage hopper is mounted so as to pivot about a pivot axis substantially perpendicular to a central axis of said hopper.

7. Apparatus as claimed in claim 3, wherein said pivot axis is provided on the side of said storage hopper facing said outlet port of said conveyor means.

8. Apparatus as claimed in claim 4, wherein said pivot axis is provided on the side of said storage hopper facing said outlet port of said conveyor means.

9. Apparatus as claimed in claim 5, wherein said pivot axis is provided on the side of said storage hopper facing said outlet port of said conveyor means.

10. Apparatus as claimed in claim 6, wherein said pivot axis is provided on the side of said storage hopper facing said outlet port of said conveyor means.

* * * * *